United States Patent [19]

Hollins

[11] Patent Number: 4,624,361
[45] Date of Patent: Nov. 25, 1986

[54] SINGLE LOG FEEDER

[75] Inventor: Bryant C. Hollins, 100 Mile House, Canada

[73] Assignee: Exco Industries Ltd., British Columbia, Canada

[21] Appl. No.: 619,787

[22] Filed: Jun. 12, 1984

[30] Foreign Application Priority Data

Feb. 14, 1984 [CA] Canada .................................. 447366

[51] Int. Cl.⁴ ............................................. B65G 37/00
[52] U.S. Cl. .................................. 198/463.5; 414/748
[58] Field of Search ............... 198/474, 443, 777, 492, 198/773, 463.5; 414/748, 745

[56] References Cited

U.S. PATENT DOCUMENTS 2,751,781  6/1956  McConnell .
3,112,021 11/1963  Forsberg ............................ 198/777
3,584,726  6/1981  Hartzell .

FOREIGN PATENT DOCUMENTS 789368   7/1968  Canada .
920544   2/1973  Canada .
922659   3/1973  Canada .
980820  12/1975  Canada .
989427   5/1976  Canada .
1048562  2/1979  Canada .
1114408 12/1981  Canada .
0865757  9/1981  U.S.S.R. .............................. 198/474

Primary Examiner—Joseph E. Valenza
Assistant Examiner—D. Glenn Dayoan
Attorney, Agent, or Firm—Lyon & Lyon

[57] ABSTRACT

An apparatus which is capable of sorting logs of varying diameter and feeding them one at a time to a log processing apparatus. A cylinder handling apparatus comprising: (a) means for receiving and holding a plurality of cylindrical objects of varying diameter and length parallel to and abutting one another in a row; and (b) means for separating and raising the foremost cylindrical object from the secondarily disposed cylindrical objects in the row and dispensing the foremost cylindrical object from the apparatus.

11 Claims, 8 Drawing Figures

SINGLE LOG FEEDER

FIELD OF THE INVENTION

This invention is directed to an apparatus for single feeding elongated cylindrical objects to suitable processing apparatus. In a specific application, this invention is directed to an apparatus which is capable of sorting logs of varying diameter and feeding them one at a time to a log processing apparatus.

BACKGROUND OF THE INVENTION

It has been a long standing problem in the cylinder handling industry to efficiently take a cylindrical object from a random group of cylindrical objects of various sizes and orientations, align the single object in a predetermined direction and direct it to a cylinder handling apparatus. This problem arises in the log handling industry. Numerous machines and processes have been designed over the years in an effort to develop an apparatus and a method of efficiently handling a wide range of logs of varying diameters and lengths mixed butts and ends and aligning them one at a time in a common direction and feeding them without interruption to a log processing machine such as a debarker or a chip and saw apparatus.

The applicant is aware of the following patents which disclose various devices for processing logs.

|  | Issue Date | Inventor |
| --- | --- | --- |
| Canadian Patent No. | | |
| 789,368 | July 9, 1968 | Ahlstedt |
| 920,544 | February 6, 1973 | Lindblom |
| 922,659 | March 13, 1973 | Rysti |
| 980,820 | December 30, 1975 | Hartzell and Gunnerman |
| 989,427 | May 18, 1976 | Valo |
| 1,048,562 | February 13, 1979 | Danielsson and Ekhoim |
| 1,114,408 | December 15, 1981 | Valo |
| U.S. Pat. No. | | |
| 2,751,781 | June 26, 1956 | McConnell |
| 3,584,726 | June 15, 1971 | Hartzell |

Ideally, a log handling apparatus capable of handling a group of logs of various diameters, lengths and orientations, and single feeding them in an aligned manner to a log processing apparatus should be able to run without interruption and be capable of feeding the logs to the log processing apparatus virtually end to end with one another. In this way, a maximum number of logs are processed in a given time. However, in practice, apparatus designed for this purpose are prone to breakdown, complexity, or do not carry out the job of separating the logs individually and feeding them one at a time without frequent interruptions. Thus, it is not uncommon for the apparatus to fail to make a separation between individual logs and thus, the operator must stop the machine, separate the plurality of logs and ensure that they are fed one at a time to the log processing apparatus. Interruptions of this sort are costly and labour intensive.

Of the devices disclosed and claimed in the references listed, two devices in particular are purported to successfully select a log from a group of logs and feed it to a log processing apparatus. The Ahlstedt patent, Canadian Pat. No. 789,368, discloses an apparatus for the selection and sidewise delivery of selected sets of long rollable objects of varying diameters from a closely spaced group of such objects, such as logs. In the device, a lift arm holds the logs back in the "up" position, and releases one log while in the "down" position. At the same time, a second log is allowed to lodge in a pocket to hold back remaining logs. The Ahlstedt apparatus appears to deal adequately with logs of relatively uniform diameter but it appears to be weak in dealing with logs of small diameter mixed with logs of large diameter. Lodging of a small log in the retaining pocket would increase the likelihood that a following larger diameter log would be pushed over the smaller log and hence disrupt operation.

Canadian Pat. No. 1,114,408, Valo, discloses and claims an apparatus which is designed specifically for the purpose of handling logs of varying diameter and feeding them one at a time to a log processing apparatus. However, the apparatus disclosed is relatively complex, expensive, and in practice has been found to be prone to breakdown due to its complexity. The apparatus utilizes a dual disc arrangement for separating the logs. The two discs rotate on separate shafts in opposite direction and are provided with peripheral notches which, in the extreme positions of the rotary movement of the discs, are directed substantially toward the inlet end and the outlet side. In practice, it has been found that the Valo apparatus cannot be operated efficiently at high speed without frequent breakdown.

SUMMARY OF THE INVENTION

I have invented a reliable mechanical device which is capable of selecting logs of varying diameter and lengths, and single feeding them end to end to a log processing apparatus.

Logs are taken from a deck or unscrambler and loaded onto the sloped skid plates of a log feeder which permits the logs to roll in a single layer until they abut the log ahead, or a contoured pocket of my device. The pocket is contoured to hold small logs back or conversely allow larger logs to roll further ahead. My device includes a series of specifically shaped lift arms which are simultaneously swung upward in an arc. These arms lift one log out of the pocket and simultaneously prevent all other logs from entering the pocket.

When the arms reach their high point of movement, the single raised log rolls over the top of the pocket. The arms then drop to their original rest position which then allows the logs on the skids to roll forward until the next log rests against the pocket and is ready to be lifted. Varying lengths of logs can be handled by adding or deleting arms and skid plates. Any size of logs can be handled by scaling the machine accordingly up or down.

The invention is directed to a cylinder handling apparatus comprising: (a) means for receiving and holding a plurality of cylindrical objects of varying diameter and length parallel to and abutting one another in a row; and (b) means for separating and raising the foremost cylindrical object from the secondarily disposed cylindrical objects in the row and dispensing the foremost cylindrical object from the apparatus. The receiving means may have an inclined upper face with the lower end thereof shaped to restrain the cylindrical objects on the face. The restraining shape may be in the form of a contoured pocket which is positioned between the lower end of the inclined upper face and a secondary inclined face, which is on the opposite side of the pocket and is at a higher elevation than the lower portion of the initial inclined face. The contoured pocket may have constructed therein a protruding abutment face which serves to hold cylindrical objects of smaller diameter at a position higher up the inclined upper face than cylindrical objects of a larger diameter.

The separating and raising means moves between an upper position and a lower position relative to the receiving means. The separating and raising means may have thereon a face which, when the separating and raising means is in an upper position, aligns generally with the secondary inclined face of the receiving means. The separating and raising means may have therein a convex shaped recess which serves to restrain the secondarily disposed cylindrical object, as the foremost cylindrical object is being separated and raised by the separating and raising means. The separating and raising means may also have an upwardly extending projection located between the convex recess and the aligning face of the separating and raising device, the projection serving to extend between the foremost and the secondary disposed cylindrical objects as the separating and raising means is raised. The restraining surface of the convex recess tends to move away from the secondary disposed cylindrical object as the separating and raising means is returned to its lower position. The upper surface of the separating and raising means is below the upper surface of the receiving means when the separating and raising means is in the lower position.

DRAWINGS

Figure 6:
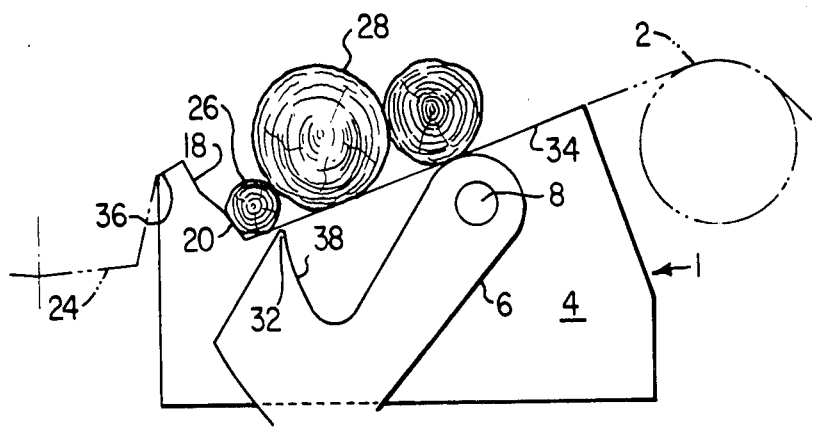
Figure 7:
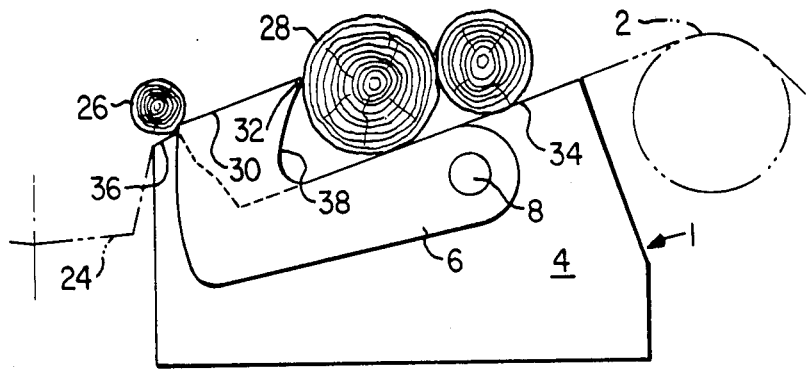
Figure 8:
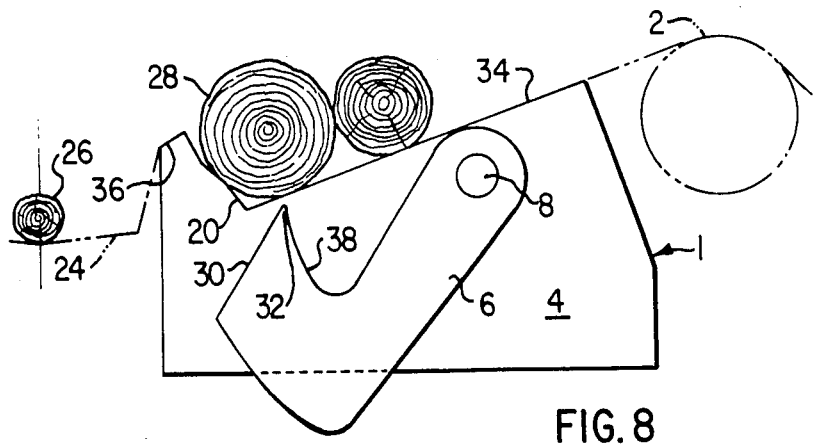

FIGS. 6, 7 and 8, in sequence, represent side elevation views illustrating the manner in which a single log feeder receives logs of varying diameter from a log unscrambler, separates them, and feeds them one at a time to a log processing apparatus.

DETAILED DESCRIPTION OF ONE EMBODIMENT OF THE INVENTION

Figure 1:
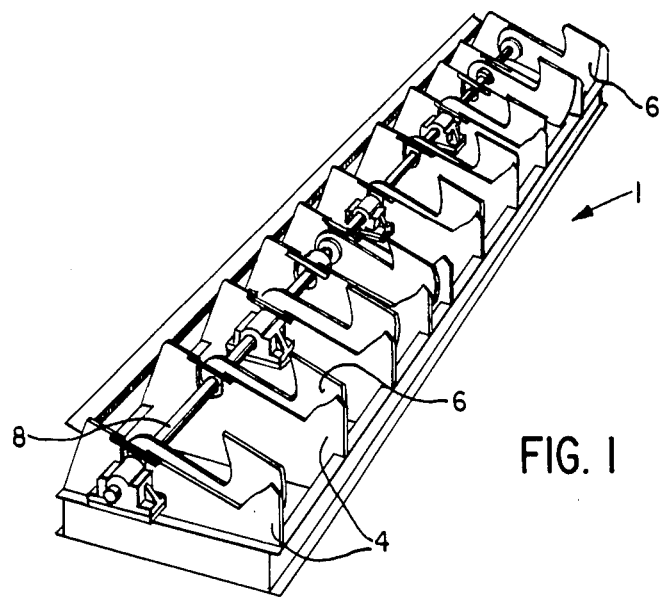
FIG. 1 represents a perspective view of the single log feeder.

Referring to FIG. 1, which represents a perspective view of the single log feeder, the single log feeder 1 is constructed of a linear series of laterally extending alternating skid plates 4 and lift arms 6. The series of skid plates 4 remains stationary, while the series of lift arms 6 are arranged to be raised or lowered, as required, about a common pivot shaft 8, which extends through the skid plates 4 and lift arms 6. The skid plates 4 and lift arms 6 are grouped in pairs. The number of skid plates 4 and lift arms 6 can be varied as required to accommodate the dimensions of all log handling mills, and various lengths of logs. Moreover, the spacing between the respective skid plates 4-lift arms 6 combinations need not be uniform. Thus, the spacing between the respective pairs of skid plates 4 and lift arms 6 may be varied in order to accommodate and fit with existing log handling equipment as installed in the log handling mill. The governing factor is that the spaces between the respective pairs of skid plates 4 and lift arms 6 should be less than the length of the logs being handled so that the logs do not drop between the respective pairs of skid plates 4 and lift arms 6. It is also not mandatory that the skid plates 4 and lift arms 6 alternate. In certain circumstances, it may be useful to have two lift arms 6 between two plates 4.

Figure 2:
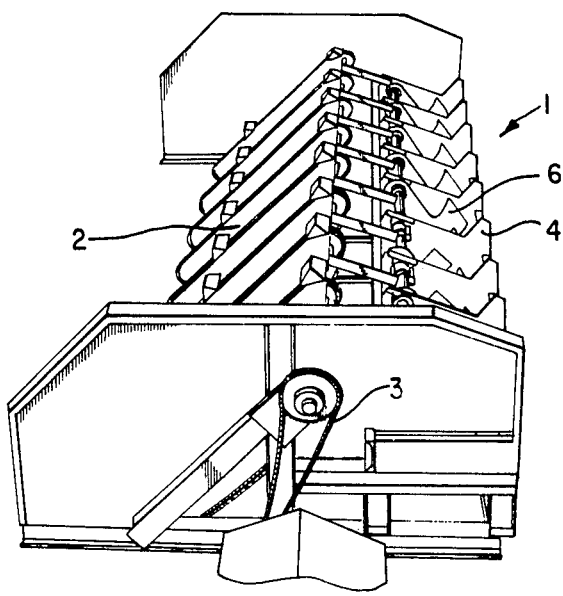
FIG. 2 represents a perspective view of the log unscrambler in combination with the single log feeder.

Referring to FIG. 2, which represents a perspective view of the single log feeder 1 in combination with a log unscrambler 2, which leads to the single log feeder 1, the purpose of the log unscrambler 2 is to arrange a group of logs in parallel. The unscrambler face obstructs the transfer of logs thereby straightening them parallel to its face. Chains with flights or lugs large enough to pick up the largest log are placed on climbing chains in rows across the face of the unscrambler 2. As the climbing chains move past the pile of logs against the face of the unscrambler 2, the flights pick logs up, usually one at a time, and raise them in parallel upwardly along the inclined upper slope of the unscrambler 2 to the top of the unscrambler 2. When the logs reach the top of the unscrambler 2, they roll to the right (as seen in FIG. 2) down the upper skid face of the single log feeder 1. The skid face, as can be seen in FIG. 2 is inclined downwardly in a direction opposite to the direction of inclination of the unscrambler 2. In FIG. 2, the series of lift arms 6 are shown in the lower position. The lift arms 6 of the single log feeder 1 are operated by hydraulic or pneumatic cylinders. The unscrambler 2 is usually driven by a power source which operates through a hydraulic or electric motor chain drive and air clutch mechanism 3. As can be recognized, other suitable drive mechanisms are feasible for either apparatus.

Figure 3:
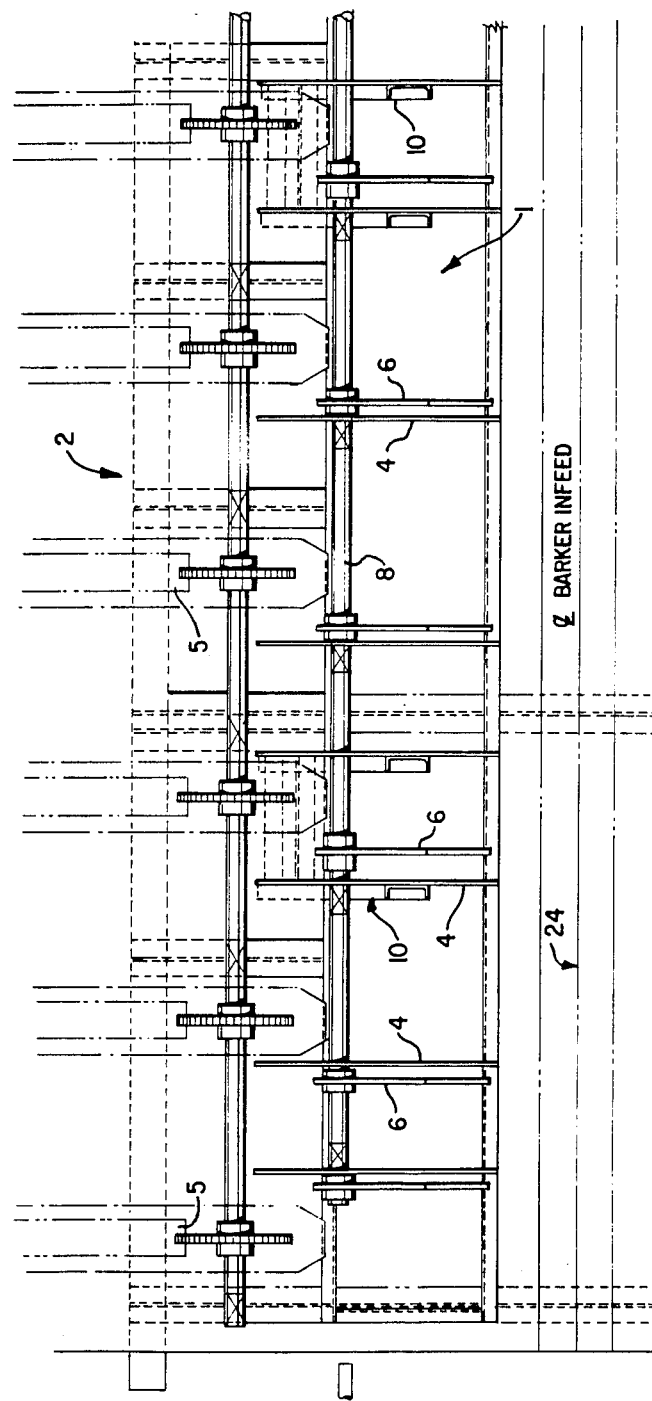
FIG. 3 represents a plan view of the log unscrambler-single log feeder combination arranged to feed logs to a log barker.

Referring to FIG. 3, which represents a plan view of the single log feeder 1 in combination with a log unscrambler 2 on one side and a barker infeed 24 on the other side, the log unscrambler 2 is conventional, and well known in the log handling art. The unscrambler 2 does not represent part of the applicant's invention. The unscrambler 2 consists of a series of parallel log conveying teeth and chains 5, or the like, which move and raise the logs in an inclined upwardly manner in the direction of the arrow. FIG. 3 illustrates in detail the manner in which a plurality of skid plates 4 and lift arms 6 in pairs, are arranged parallel to one another in a linear series. The skid plates 4 alternate respectively with accompanying lift arms 6 and extend in the same direction as the direction of movement of the unscrambler 2. A long pivot shaft 8 extends at right angles through the plurality of parallel pairs of skid plates 4 and lift arms 6. The shaft 8 pivots freely relative to the skid plates 4. However, the plurality of lift arms 6 are affixed to the shaft 8 and are mounted by suitable securing means at respective points along the length of the pivot shaft 8. The pivot shaft 8 is journalled for rotation within suitable supporting bearing means. Since each lift arm 6 is firmly secured at its point of connection to the pivot shaft 8, and the pivot shaft 8 is free to rotate within the bearing means, the plurality of lift arms 6 can be moved alternately between a lower position and an upper position by rotating the pivot shaft 8. FIG. 3 also illustrates a plurality of cylinder mounts 10 which are adapted to receive respective hydraulic piston-cylinder mechanism (not shown) which are used to raise or lower the lift arms 6. FIG. 3 also illustrates on the side opposite the unscrambler 2 the infeed 24 of an appropriate log handling apparatus such as a log barker or log chip and saw apparatus. The infeed 24 as depicted in FIG. 3 travels in the direction of the arrows and receives logs deposited thereon in end to end relationship by the lift arms 6. In practice, the infeed can travel in either direction.

Figure 4:
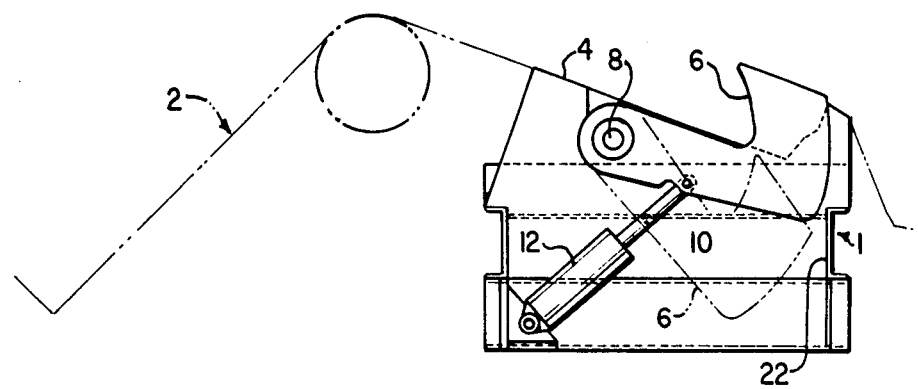
FIG. 4 represents a side elevation view of the single log feeder.

FIG. 4, which represents a side elevation view of the single log feeder 1 in combination with a dotted-line representation of the unscrambler 2, illustrates the manner in which the lift arm 6 moves between a lower and an upper position relative to skid plate 4. The lift arm 6 depicted in solid line indicates the upper position of the lift arm 6. In the lower position, the lift arm 6 is shown in dotted lines. As discussed previously, the lift arm 6 is affixed to pivot shaft 8. A hydraulic cylinder-piston means 12, which is mounted on cylinder mount 10, moves the lift arm 6 between a lower position and an upper position. FIG. 4 also illustrates the basic frame 22 of the single log feeder 1. The frame 22 is of sufficiently strong construction to support the weight of the plurality of lift arms 6, skid plates 4, shaft 8, cylinders 12 and the weight of logs rolling down the upper faces of the skid plates 4 and the lift arms 6.

Figure 5:
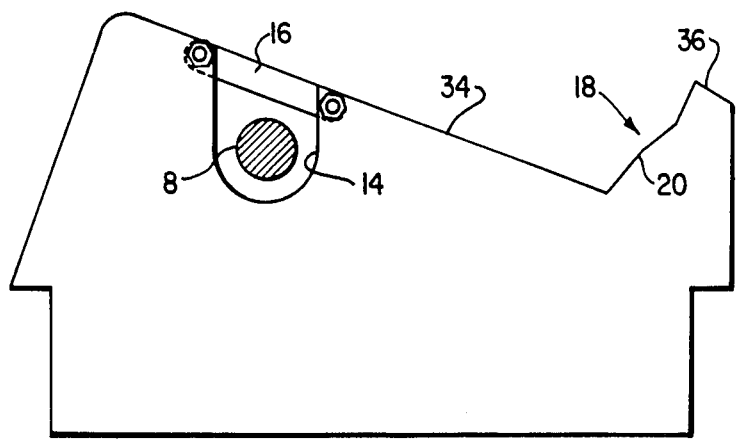
FIG. 5 represents a side elevation view of a skid plate.

FIG. 5 represents a detailed side elevation detailed view of the construction of the skid plate 4. The skid plate 4 has constructed therein a shaft recess 14, which permits the pivot shaft 8 to extend laterally without interference through the skid plate 4. A skid plate bar 16 is bolted or welded in place to bridge the upper part of the shaft recess 14. This bar 16 permits logs to roll downwardly without interference along the upper edge of skid plate 4. The long initial skid face of skid plate 4 is identified as 34 in FIG. 5. The skid plate 4 also has a short terminal skid face 36, as seen in FIG. 5. The upper portion of the skid plate 4 has a contoured pocket 18 constructed between the initial skid face 34 and the terminal skid face 36. Located within the overall contoured pocket 18 is a small log abutment face 20. In practice, the dimensions of the skid plate 4 and the contoured pocket 18, including the small log abutment face 20, are constructed to accommodate the diameters of the sizes of logs which are to be typically handled by the single log feeder. The range of diameters, for example, 3½" to 9", 4" to 16", 6" to 20", etc., while depending on the size of the machine, all work on the same principle. The single log feeder is typically constructed to accommodate logs with diameters ranging from 4 inches to 16 inches. However, as can be readily recognized, the dimensions of the skid plate 4 can be increased in order to accommodate logs of larger diameter. Bearings for the feeder 2 are mounted on a flate plate and gussetted to the side of the skid plate. If need be, for extra load carrying capacity, intermediate bearings supporting shaft 8 can be installed.

FIGS. 6, 7 and 8 in sequence illustrate the manner in which the single log feeder 1 separates a small log 26 from a group of logs including a large log 28 and delivers the small log 26 to the infeed 24 of a typical barker apparatus or chip and saw apparatus. In FIG. 6, the lift arm 6 is shown in its lower position. The small log 26 and the large log 28 rest side-by-side on the downwardly inclined initial skid face 34. The logs 26 and 28 have been deposited on skid surface 34 by unscrambler 2. The small log 26 abuts the small log abutment face 20. The purpose of the small log abutment face 20 is to hold the small log 26 partially upwardly and to the right (as seen in FIG. 6) along the inclined initial skid face 34. If the small log abutment face 20 were not present, the small log 26 would rest at the base of the contoured pocket 18, the large log 28 would be permitted to advance further down the inclined initial skid face 34 (to the left, as seen in FIG. 6) and hence when the lift arm 6 was raised, there would be a good possibility that both the small log 26 and large log 28 would be raised upwardly and dumped onto the infeed 24. This would not be acceptable since it is important that only a single log be put on the infeed 24. More than one log would create problems for the log processing apparatus. If both logs 26 and 28 were dropped on the infeed 24, the operator must stop the single log feeder 1 for a short period of time while the two logs were separated and fed individually in linear series on the infeed 24.

As seen in FIG. 7, when the lift arm 6 is in a raised position, its upper skid face 30 aligns more or less with terminal skid face 36 of skid plate 4. As lift arm 6 moves upwardly, its log separator point 32 divides the small log 26 from the large log 28. The face 30 lifts the small log 26 upwardly, while at the same time the point 32 moves large log 28 upwardly and rearwardly along the initial skid face 34. Small log 26 then rolls along skid face 30 of lift arm 6, over terminal skid face 36, and onto the infeed 24, as can be seen in FIG. 8.

Meanwhile, as demonstrated in FIG. 8, the lift arm 6 returns to its lower position, thereby permitting large log 28 to roll downwardly along the initial skid face 34, so that it comes to rest against contour pocket 18. However, as FIG. 8 illustrates, when a large log is involved, large log 28 is not held back, if at all, by small log abutment face 20. Thus, large log 28 can rest farther down the inclined surface of initial skid face 34. When lift arm 6 is again raised, separator point 32 moves upwardly behind the large log 28, and ahead of the log which follows the large log 28, and thereby separates the two logs. As the lift arm 6 moves upwardly, it raises large log 28 upwardly so that it can ultimately roll over terminal skid face 36 and onto the infeed 24.

As can also be seen in FIGS. 6, 7 and 8, the lift arm 6 is constructed to have therein a pocket in the shape of an arc 38, which serves the purpose of holding back small logs. When large logs are involved, such as the large log 28 shown in FIG. 7, the log is held back by separator point 32. However, if a small log is first in line, it rests against arc 38. The contour of arc 38 is designed so that as lift arm 6 moves downwardly, the arc 38 tends to move away from the log which it is holding. It has been found that when arc 38 has a radius which is coincident with the axis of pivot shaft 8, arc 38 tends to bind against the log as lift arm 6 is being lowered. Thus, to prevent binding, it is advantageous to have the pivot point of the radius of arc 38 at a location slightly above the axis of pivot shaft 8. In this way, the arc 38 tends to move slightly away from the log being held by the arc 38 as lift arm 6 is lowered.

It has been found that the single log feeder 1, in operation, is very reliable, sturdy, not prone to breakdown, and can be operated at high rates of speed. All components making up the construction of the single log feeder 1 are of rugged construction, and require virtually no maintenance.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

1. An apparatus for individually sorting and separating a plurality of cylindrical objects of the same or varying diameter and length comprising:
   (a) inclined receiving means including an inclined receiving face which receives the cylindrical objects by having the cylindrical objects roll laterally onto the upper end of the inclined receiving face, the inclined receiving means having at its lower end a restraining means including a restraining face which extends at an angle to the receiving face and which holds the cylindrical objects in parallel and abutting relationship with one another at the lower end of the inclined receiving face and upwardly along the inclined receiving face; and
   (b) cylindrical object separating and raising means associated with the inclined receiving means for separating and raising the foremost restraining means abutting cylindrical object from the secondarily disposed cylindrical objects on the inclined receiving face and dispensing the foremost cylindrical object from the apparatus in a direction away from the direction in which the cylindrical objects are received by the inclined receiving means, the separating and raising means including an arm pivoted at a location upstream relative to the restraining face to reciprocate upwardly and downwardly between a lower position and an upper position relative to the inclined receiving face, said arm including a lifting portion underlying the inclined receiving face when in a lower position, and being positioned at least in part above at least a portion of the inclined receiving face when in an upper position such that the lifting portion is engageable with the foremost object to lift it above the restraining face, said arm further including a separating portion adjacent an upstream end of said lifting portion and being engageable with a secondarily disposed cylindrical object to separate it from the foremost object as the latter is lifted by said lifting portion, said separating portion being movable upstream relative to said restraining face during upward movement of said arm.

2. An apparatus according to claim 1 wherein the restraining means is constructed in the form of a contoured pocket which is positioned at the lower end of the inclined receiving face, the inclined receiving face forming one side of the pocket, and the other side of the pocket being formed by the restraining face which angles upwardly and away from the lower portion of inclined receiving face.

3. An apparatus according to claim 2 wherein the restraining face of the contoured pocket has constructed therein at its base a protruding abutment face which extends upwardly along a portion of the restraining face and serves to hold cylindrical objects of smaller diameter at a position higher up the inclined receiving face of the receiving means than cylindrical objects of a larger diameter.

4. An apparatus according to claim 2 wherein the lifting portion of the arm has thereon an upwardly facing face which, when the arm is in an upper position aligns generally with the top of the restraining face.

5. An apparatus according to claim 1 wherein the separating portion of the arm includes a protrusion serving to extend between and separate the foremost and the secondary disposed cylindrical objects on the inclined receiving face as the arm is raised.

6. An apparatus according to claim 5 wherein the protrusion tends to move away from the secondary disposed cylindrical object as the arm is returned to its lower position.

7. An apparatus according to claim 4 wherein the arm is constructed so that at least a portion of the face of the lifting portion, when in an upper position, is of a higher elevation than the remainder of the arm.

8. Apparatus according to claim 1 wherein said arm includes a portion defining a pocket for receiving secondarily positioned objects as said arm is raised above said receiving face, said portion defining said pocket being movable upstream relative to said retaining face during upward movement of said arm.

9. Apparatus defined in claim 1 wherein said lifting portion has an effective lifting area which is movable above the receiving face and increases as the lifting portion is raised above the receiving face.

10. Apparatus defined in claim 1 wherein said arm includes a portion defining a pocket for receiving secondarily positioned objects as said arm is raised above said receiving face, said portion defining said pocket being movable upstream relative to said retaining face during upward movement of said arm, and wherein said lifting portion has an effective lifting area which is movable above the receiving face and increases as the lifting portion is raised above the receiving face.

11. Apparatus for individually handling and lifting a plurality of generally cylindrical objects of the same or varying diameter and length, the apparatus comprising in combination:
   (a) inclined receiving means including an inclined receiving face which receives the cylindrical objects by having the cylindrical objects roll laterally onto the upper end of the inclined receiving face, the inclined receiving means hvaing at its lower end a restraining means including a restraining face which extends at an angle to the receiving face and which holds the cylindrical objects in parallel and abutting relationship with one another at the lower end of the inclined receiving face and upwardly along the inclined receiving face with the foremost object abutting against the restraining face; and
   (b) cylindrical object separating and raising means associated with the inclined receiving means for separating and raising the foremost object abutting against the restraining face from the secondarily disposed object on the receiving face and dispensing the foremost object from the apparatus in a direction away from the direction in which the objects are received by the inclined receiving means, the separating and raising means being reciprocable upwardly and downwardly between a lower position and an upper position relative to the receiving face and including a lifting portion movable above and arranged relative to the receiving face such that the lifting portion is engageable with the foremost object to lift it above the restraining face when the separating and raising means moves towards its upper position, said separating and raising means further including a separating portion located adjacent an upstream end of said lifting portion and being engageable with a secondarily disposed object to separate it from the foremost object as the latter is lifted by said lifting portion, said separating portion being movable upstream relative to said restraining face during upward movement thereof, and wherein said lifting portion has an effective lifting area which is movable above the receiving face and increases as the lifting portion is raised above the receiving face.

* * * * *